US012589748B1

(12) United States Patent
Kang

(10) Patent No.: US 12,589,748 B1
(45) Date of Patent: Mar. 31, 2026

(54) APPARATUS AND METHOD FOR CONTROLLING TRAVEL MODE OF FOUR-WHEEL DRIVE VEHICLE

(71) Applicants: Hyundai Motor Company, Seoul (KR); Kia Corporation, Seoul (KR)

(72) Inventor: Dong Hun Kang, Hwaseong-si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/052,790

(22) Filed: Feb. 13, 2025

(30) Foreign Application Priority Data

Sep. 27, 2024 (KR) ......................... 10-2024-0131948

(51) Int. Cl.
*B60W 30/182* (2020.01)
*B60W 30/184* (2012.01)
(52) U.S. Cl.
CPC ...... *B60W 30/1843* (2013.01); *B60W 30/182* (2013.01); *B60W 2510/0638* (2013.01); *B60W 2510/0657* (2013.01); *B60W 2510/1015* (2013.01); *B60W 2510/1025* (2013.01); *B60W 2552/00* (2020.02); *B60W 2710/0644* (2013.01); *B60W 2710/0666* (2013.01)
(58) Field of Classification Search
CPC ............. B60W 10/14; B60W 30/1843; B60W 30/182; B60W 30/18172; B60W 2510/0638; B60W 2510/0657
USPC .............................................. 701/65, 51, 66
See application file for complete search history.

(56) References Cited

U.S. PATENT DOCUMENTS

| 2002/0058565 A1* | 5/2002 | Yamamoto | ............... B60K 6/52 |
| | | | 903/917 |
| 2008/0033618 A1* | 2/2008 | Kwon | ................. B60W 10/023 |
| | | | 701/54 |
| 2023/0166715 A1* | 6/2023 | Adcock | .................. B60K 6/485 |
| | | | 701/22 |

FOREIGN PATENT DOCUMENTS

KR 10-2023-0075947 A 5/2023

* cited by examiner

*Primary Examiner* — Roger L Pang
(74) *Attorney, Agent, or Firm* — MORGAN, LEWIS & BOCKIUS LLP

(57) ABSTRACT

An apparatus for controlling a travel mode of a four-wheel drive vehicle, the apparatus includes a heat generation amount calculation unit configured to determine a heat loss amount of a torque converter, a rough terrain travel start determination unit configured to determine, whether to start travel on a road having rough terrain conditions, a first travel mode control unit configured to control entry into a semi-off-road travel mode when a current travel mode is an on-road travel mode, a rough terrain travel maintenance determination unit configured to determine whether to maintain the travel on the road having the rough terrain conditions during the semi-off-road travel mode, based on the heat loss amount, and a second travel mode control unit configured to control entry into a dedicated off-road travel mode from the current travel mode when it is determined to maintain the travel on the road having the rough terrain conditions.

18 Claims, 8 Drawing Sheets

300

400

S100

HEAT GENERATION AMOUNT
CALCULATION STEP $$[Hloss = f\,(OUTPUTeng,\ OUTPUTturb)]$$

S200

FIRST COMPARISON STEP — S210

FIRST TIME COUNT STEP — S220

ROUGH TERRAIN TRAVEL
DETERMINATION STEP — S230

S300

| FIRST DETERMINATION STEP | S310 |
| TRAVEL MODE CONTROL STEP | S320 |

S400

| SECOND COMPARISON STEP | S410 |
| SECOND TIME COUNT STEP | S420 |
| ROUGH TERRAIN TRAVEL MAINTENANCE DETERMINATION STEP | S430 |

S100

FIRST CALCULATION STEP
(Sratio = (RPMeng/RPMturb))                    S110

SECOND CALCULATION STEP
(TCratio = f(Sratio))                          S120

THIRD CALCULATION STEP
(TQturb[Nm] = TQeng[Nm] * TCratio)             S130

FOURTH CALCULATION STEP
(Hloss = OUTPUTeng−OUTPUTturb)                 S140

APPARATUS AND METHOD FOR CONTROLLING TRAVEL MODE OF FOUR-WHEEL DRIVE VEHICLE

CROSS-REFERENCE TO RELATED APPLICATION(S)

The present application claims priority to Korean Patent Application No. 10-2024-0131948 filed on Sep. 27, 2024, the entire contents of which is incorporated herein for all purposes by this reference.

BACKGROUND OF THE PRESENT DISCLOSURE

Field of the Present Disclosure

The present disclosure relates to an apparatus and a method for controlling a travel mode of a four-wheel drive vehicle.

Description of Related Art

In general, a travel mode of a four-wheel drive vehicle may have, for example, an on-road travel mode (for example, a 4H travel mode), a 4A travel mode, and a 4L travel mode. The respective travel modes may be different from each other in terms of a method of controlling front wheels and rear wheels and a gear stage applied according to travel conditions.

Each travel mode may be manually selected or changed by a user, and the characteristics of each travel mode are described in a user manual. Thus, when the user is familiar with the user manual, a travel mode suitable for a travel condition may be selected by the user. For example, a user who is familiar with the user manual may select and drive a 4L travel mode suitable for off-road travel in off-road conditions.

However, even when travelling on-road in the existing 4H mode or semi-off-road travel mode (for example, a 4A travel mode), and then entering and travelling off-road, a user who is not familiar with the user manual may, undesirably, continue to travel off-road while maintaining a current travel mode (for example, 4H or 4A).

For example, when a vehicle continues to travel on a road having a sand condition, one of off-road test conditions, in a 4H mode or a 4A mode rather than a 4L mode, a dedicated off-road vehicle travel mode, among evaluation modes of a pickup truck vehicle, a temperature of transmission oil may become higher than a reference temperature.

As described, when a vehicle such as a pickup truck vehicle enters off-road conditions without changing a travel mode but continues to travel on a road having rough terrain conditions, such as off-road conditions, an over-temperature issue may occur in which a transmission oil temperature is higher than the reference temperature. As a result, an engine warning lamp may be turned on and eventually operation of the engine may be stopped.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and a method for controlling a four-wheel drive vehicle, the apparatus and method configured for automatically detecting, based on a heat loss amount of a torque converter, entry into a road having rough terrain conditions when the four-wheel drive vehicle enters and travels on the road having the rough terrain conditions, and automatically changing a current travel mode to a travel mode (for example, an off-road travel mode) suitable for the road having the rough terrain conditions when the current travel mode is an on-road travel mode.

However, the aspects of the present disclosure are not limited to those set forth herein, and other aspects set forth herein will be more easily understood by those skilled in the art from the description below.

According to an aspect of the present disclosure, there is provided an apparatus for controlling a travel mode of a four-wheel drive vehicle, the apparatus including a heat generation amount calculation unit configured to determine a heat loss amount of a torque converter, based on input information of the four-wheel drive vehicle, a rough terrain travel start determination unit configured to determine, based on the heat loss amount, whether to start travel on a road having rough terrain conditions, a first travel mode control unit configured to control entry into a semi-off-road travel mode (for example, a 4A travel mode) when a current travel mode is an on-road travel mode (for example, a 4H travel mode), when it is determined to start the travel on the road having the rough terrain conditions, a rough terrain travel maintenance determination unit configured to determine whether to maintain the travel on the road having the rough terrain conditions during the semi-off-road travel mode, based on the heat loss amount (for example, a 4A travel mode), and a second travel mode control unit configured to control entry into a dedicated off-road travel mode (for example, a 4L travel mode) from the current travel mode when it is determined to maintain the travel on the road having the rough terrain conditions.

The heat loss amount calculation unit may be configured to determine the heat loss amount, using an engine output value based on engine Revolutions Per Minute (RPM) and engine torque, and a turbine output value based on turbine RPM and turbine torque.

The rough terrain travel start determination unit may include a first comparison unit configured to determine whether the heat loss amount is greater than a first threshold heat generation amount, a first time count unit configured to count a first elapsed time from a point in time at which the heat loss amount is greater than the first threshold heat generation amount, and a rough terrain travel determination unit configured to determine whether the first elapsed time is greater than or equal to a first reference time, and to determine, based on a result of determining whether the first elapsed time is greater than or equal to the first reference time, whether to start travel on the road having the rough terrain conditions.

The first travel mode control unit may include a first determination unit configured to determine whether the current travel mode is the on-road travel mode (for example, a 4H travel mode) when it is determined to start the travel on the road having the rough terrain conditions, and a travel mode control unit configured to change the current travel mode to the semi-off-road travel mode (for example, a 4A travel mode) when the current travel mode is the on-road travel mode (for example, a 4H travel mode).

The rough terrain travel maintenance determination unit may include a second comparison unit configured to determine whether the heat loss amount is greater than a second threshold heat generation amount during the semi-off-road travel mode (for example, a 4A travel mode), a second time count unit configured to count a second elapsed time from a point in time at which the heat loss amount is greater than the second threshold heat generation amount, and a rough terrain travel maintenance determination unit configured to determine whether the second elapsed time is greater than a second reference time, and to determine, based on a result of determining whether the second elapsed time is greater than the second reference time, whether to maintain the travel on the road having the rough terrain conditions.

The heat generation amount calculation unit may include a first calculation unit configured to determine a speed ratio, using a ratio of the engine RPM to the turbine RPM, a second calculation unit configured to determine, based on the speed ratio, a torque converter ratio, a third calculation unit configured to determine, based on the torque converter ratio and the engine torque, the turbine torque, and a fourth calculation unit configured to determine the heat loss amount, based on the engine output value using the engine RPM and the engine torque, and the turbine output value using the turbine RPM and the turbine torque.

According to another aspect of the present disclosure, there is provided a method for controlling a travel mode of a four-wheel drive vehicle, the method including a heat generation amount calculation step of determining, based on input information of the four-wheel drive vehicle, a heat loss amount of a torque converter, a rough terrain travel start determination step of determining, based on the heat loss amount, whether to start travel on a road having rough terrain conditions, a first travel mode control step of controlling entry into a semi-off-road travel mode (for example, a 4A travel mode) when a current travel mode is an on-road travel mode (for example, a 4H travel mode), when it is determined to start the travel on the road having the rough terrain conditions, a rough terrain travel maintenance determination step of determining whether to maintain the travel on the road having the rough terrain conditions during the semi-off-road travel mode, based on the heat loss amount (for example, a 4A travel mode), and a second travel mode control step of controlling entry into a dedicated off-road travel mode (for example, a 4L travel mode) from the current travel mode when it is determined to maintain the travel on the road having the rough terrain conditions.

The heat loss amount calculation step may include determining the heat loss amount, using an engine output value based on an engine RPM and engine torque, and a turbine output value based on a turbine RPM and turbine torque.

The rough terrain travel start determination step may include a first comparison step of determining whether the heat loss amount is greater than a first threshold heat generation amount, a first time count step of counting a first elapsed time from a point in time at which the heat loss amount is greater than the first threshold heat generation amount, and a rough terrain travel determination step of determining whether the first elapsed time is greater than or equal to a first reference time, and determining, based on a result of determining whether the first elapsed time is greater than or equal to the first reference time, whether to start travel on the road having the rough terrain conditions.

The first travel mode control step may include a first determination step of determining whether the current travel mode is the on-road travel mode (for example, a 4H travel mode) when it is determined to start the travel on the road having the rough terrain conditions, and a travel mode control step of changing the current travel mode to the semi-off-road travel mode (for example, a 4A travel mode) when the current travel mode is the on-road travel mode (for example, a 4H travel mode).

The rough terrain travel maintenance determination step may include a second comparison step of determining whether the heat loss amount is greater than a second threshold heat generation amount during the semi-off-road travel mode (for example, a 4A travel mode), a second time count step of counting a second elapsed time from a point in time at which the heat loss amount is greater than the second threshold heat generation amount, and a rough terrain travel maintenance determination step of determining whether the second elapsed time is greater than a second reference time, and to determine, based on a result of determining whether the second elapsed time is greater than the second reference time, whether to maintain the travel on the road having the rough terrain conditions.

The heat generation amount calculation step may include a first calculation step of determining a speed ratio, using a ratio of the engine RPM to the turbine RPM, a second calculation step of determining, based on the speed ratio, a torque converter ratio, a third calculation step of determining, based on the torque converter ratio and the engine torque, the turbine torque, and a fourth calculation step of determining the heat loss amount, based on the engine output value using the engine RPM and the engine torque, and the turbine output value using the turbine RPM and the turbine torque.

Furthermore, aspects of the present disclosure are not limited to the above-described aspects, and another aspect may be additionally understood in the process described below.

According to example embodiments of the present disclosure, when a four-wheel drive vehicle enters and travels on a road having rough terrain conditions, entry into the road having the rough terrain conditions may be automatically detected based on a heat loss amount of a torque converter. When a current travel mode is an on-road travel mode, the current travel mode may be automatically changed to a travel mode (for example, off-road travel mode) suitable for the road having the rough terrain conditions, preventing an excessive increase in transmission oil temperature.

However, the various and beneficial advantages and effects of the present disclosure are not restricted to those set forth herein, and will be more easily understood in a process of describing specific example embodiments.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
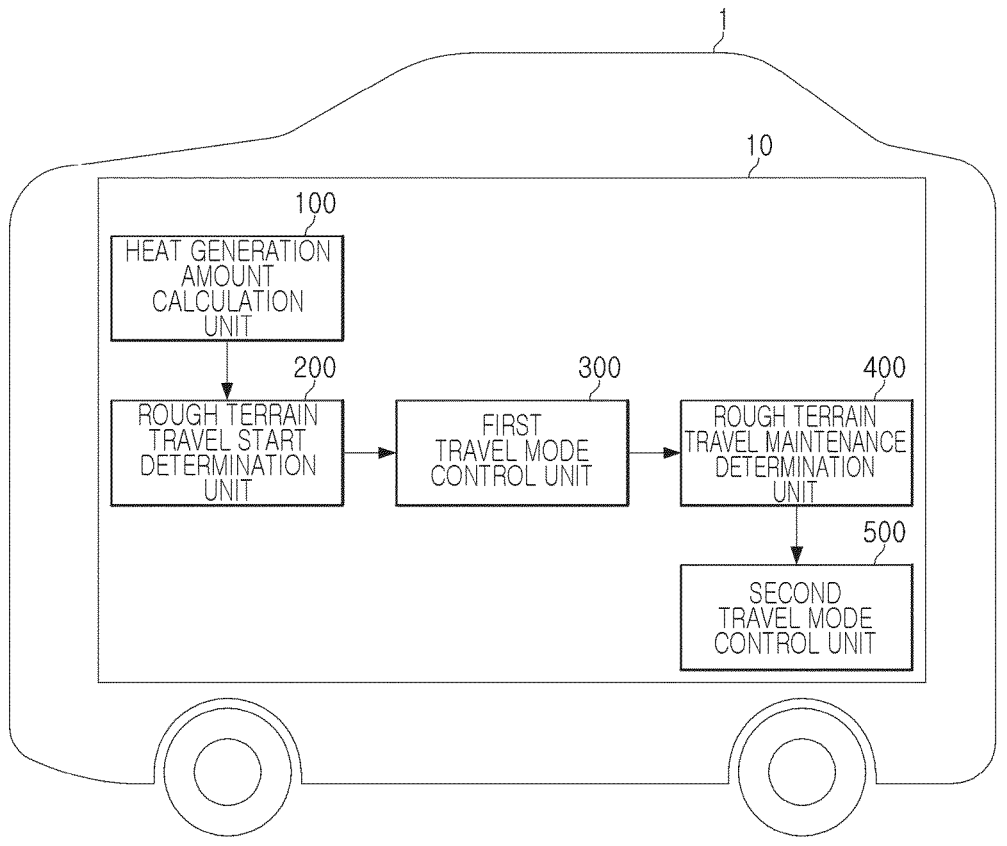
FIG. 1 is an exemplary diagram illustrating an apparatus for controlling a travel mode of a four-wheel drive vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, specific example embodiments of the present disclosure will be described with reference to the accompanying drawings. The following detailed description is provided to aid in a comprehensive understanding of a method, an apparatus, and/or a system described in the present specification. However, the detailed description is for illustrative purposes only, and the present disclosure is not limited thereto.

In describing the example embodiments of the present disclosure, when it is determined that a detailed description of a known technology related to the present disclosure may unnecessarily obscure the gist of the present disclosure, the detailed description thereof will be omitted. Furthermore, terms to be described below are terms defined based on functions in an exemplary embodiment of the present disclosure, which may vary depending on intention or custom of a user or operator. Therefore, the definition of these terms should be made based on the contents throughout the present specification. The terminology used herein is for describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in the present specification, specify the presence of stated features, integers, steps, operations, elements, components or a combination thereof, but do not preclude the presence or addition of one or more other features, integers, steps, operations, elements, components, and/or groups thereof.

Hereinafter, example embodiments of the present disclosure will be described in more detail with reference to the accompanying drawings.

FIG. 1 is an exemplary diagram illustrating an apparatus for controlling a travel mode of a four-wheel drive vehicle according to an exemplary embodiment of the present disclosure.

Referring to FIG. 1, a four-wheel drive vehicle travel mode control apparatus 10 may be mounted on a four-wheel drive vehicle 1, and may include a heat generation amount calculation unit 100, a rough terrain travel start determination unit 200, a first travel mode control unit 300, a rough terrain travel maintenance determination unit 400, and a second travel mode control unit 500.

The heat generation amount calculation unit 100 may determine a heat loss amount (Hloss) of a torque converter based on input information of the four-wheel drive vehicle 1.

For example, input information necessary when the heat generation amount calculation unit 100 determines the heat loss amount (Hloss) may be an engine RPM (RPMeng), a turbine RPM (RPMturb), and engine torque (TQeng), and may be directly input from a sensor for detecting an engine state or a sensor for detecting a turbine state, or a device for collecting information on a vehicle, such as an electronic control unit (ECU) or a vehicle control unit (VCU), and a sensor or device for receiving information need not to be limited to specified devices.

Based on the heat loss amount (Hloss), the rough terrain travel start determination unit 200 may determine whether to start travel of the vehicle on a road having rough terrain conditions. For example, rough terrain conditions may be a condition of off-road other than a general road, and may be, for example, an unpaved road which is not flat with soil or sand gravel.

When it is determined to start the travel on the road having the rough terrain conditions, the first travel mode control unit 300 may be configured for controlling entry into a semi-off-road travel mode (for example, a 4H travel mode) when a current travel mode is an on-load travel mode (for example, a 4A travel mode). For example, on-load may include a meaning of counterpart to that of off-road, and may be a flat paved road.

Based on the heat loss amount (Hloss), the rough terrain travel maintenance determination unit 400 may determine whether to maintain the travel on the road having the rough terrain conditions during the semi-off-road travel mode (for example, a 4A travel mode).

When the rough terrain travel maintenance determination unit 400 concludes maintaining the travel on the road having the rough terrain conditions, the second travel mode control unit 500 may be configured for controlling entry into a dedicated off-road travel mode (for example, a 4A travel mode) from the current travel mode (for example, a 4L travel mode).

In an exemplary embodiment of the present disclosure, each of the heat generation amount calculation unit 100, the rough terrain travel start determination unit 200, the first travel mode control unit 300, the rough terrain travel maintenance determination unit 400, and the second travel mode control unit 500 may be implemented as an individual processor or may be implemented as a single integrated processor, and is not limited thereto.

Furthermore, each of the heat generation amount calculation unit 100, the rough terrain travel start determination unit 200, the first travel mode control unit 300, the rough terrain travel maintenance determination unit 400, and the second travel mode control unit 500 may be implemented hardware element(s), software element(s), or a combination thereof in at least one integrated circuit (IC) embedded in the four-wheel drive vehicle travel mode control apparatus 10, but the present disclosure is not limited thereto.

For example, a 4H travel mode may be a method of mechanically determining front/rear wheel torque distribution under a general on-road condition (in the city or at high speed (i.e., a speed higher than a predetermined speed)), a 4A travel mode may be a method of generating a high front/rear wheel torque ratio by adding a low-stage gear in a semi-off-road condition, and a 4L travel mode may be a method of electronically distributing front/rear wheel torque under a dedicated off-road condition.

In the drawings of the present disclosure, unnecessary repeated descriptions of components including the same reference numeral and the same function may be omitted, and differences between the drawings may be described.

Figure 2:
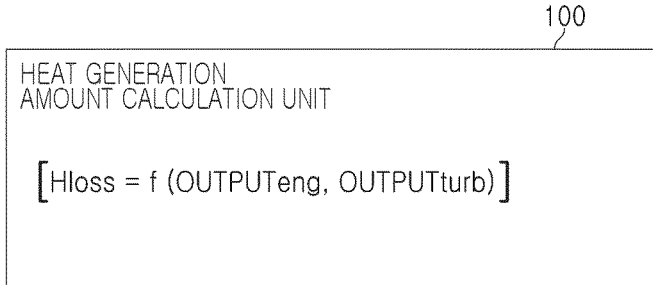
FIG. 2 is an exemplary diagram illustrating a heat generation calculation unit.

FIG. 2 is an exemplary diagram illustrating a heat generation calculation unit.

Referring to FIG. 2, the heat generation amount calculation unit 100 may be configured to determine the heat loss amount (Hloss), using an engine output value (OUTPUTeng) based on the engine RPM (RPMeng) and the engine torque (TQeng), and a turbine output value (OUTPUTturb) based on the turbine RPM (RPMturb) and turbine torque (TQturb), as indicated in Equation 1 below.

$$Hloss = f(OUTPUTeng, OUTPUTturb) \qquad \text{[Equation 1]}$$

In f( ) of Equation 1, f may denote a function, and Hloss may denote a functional relationship with factors in ( ).

Figure 3:
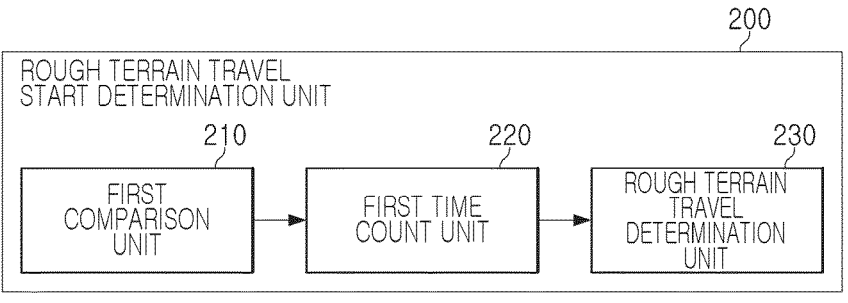
FIG. 3 is an exemplary diagram illustrating a rough terrain travel start determination unit.

FIG. 3 is an exemplary diagram illustrating a rough terrain travel start determination unit.

Referring to FIG. 3, the rough terrain travel start determination unit 200 may include a first comparison unit 210, a first time count unit 220, and a rough terrain travel determination unit 230.

The first comparison unit 210 may be configured to determine whether the heat loss amount (Hloss) is greater than a first threshold heat generation amount (Hth1). For example, when the heat loss amount (Hloss) is greater than the first threshold heat generation amount (Hth1), the first comparison unit 210 may output a first comparison signal including a level of logic '1' to the first time count unit 220. When the heat loss amount (Hloss) is less than or equal to the first threshold heat generation amount (Hth1), the first comparison unit 210 may output a first comparison signal including a level of logic '0' to the first time count unit 220.

The first time count unit 220 may count a first elapsed time (TC1) from a point in time at which the heat loss amount (Hloss) is greater than the first threshold heat generation amount (Hth1). For example, when a level of the first comparison signal input from the first comparison unit 210 is logic "1," the first time count unit 220 may start to count elapsed time and output the first elapsed time (TC1), which is a time count value, to the rough terrain travel determination unit 230.

The rough terrain travel determination unit 230 may be configured to determine whether the first elapsed time (TC1) is greater than or equal to a first reference time (Tref1), and may be configured to determine whether to start travel on a road having rough terrain conditions according to a determination result. For example, when the first elapsed time (TC1) is greater than or equal to a reference time (Tref), the rough terrain travel determination unit 230 may be configured to determine that travel on the road having the rough terrain conditions is started. For example, for accuracy of an operation, the rough terrain travel determination unit 230 may be configured to determine that travel on the road having the rough terrain conditions is started when a state in which the first elapsed time (TC1) is greater than or equal to the reference time (Tref) is maintained for a preset time (for example, tens of seconds), but such a configuration is only an example for description and understanding, and the present disclosure is not limited thereto.

Figure 4:
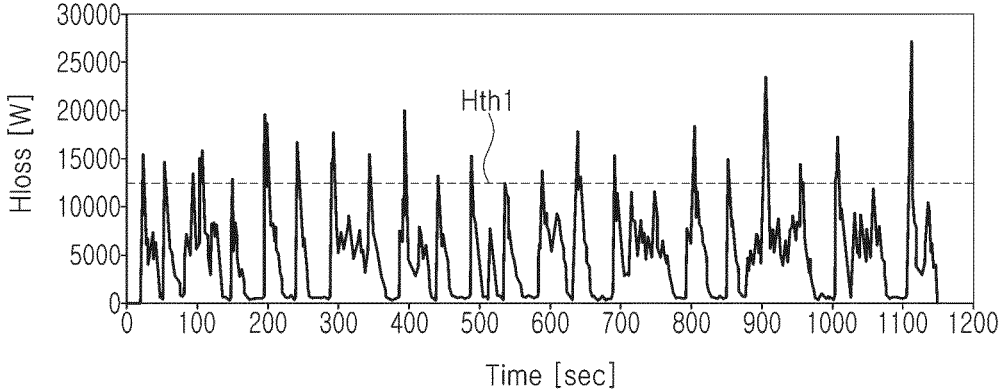
FIG. 4 is an exemplary graph illustrating a heat loss amount and a first threshold heat generation amount.

FIG. 4 is an exemplary graph illustrating a heat loss amount and a first threshold heat generation amount.

The graph illustrated in FIG. 4 illustrates a heat loss amount (Hloss) and a first threshold heat generation amount (Hth1). When the heat loss amount (Hloss) is greater than a preset first threshold heat generation amount (Hth1), it may be determined as occurrence of an abnormality. When the heat loss amount (Hloss) is less than or equal to the preset first threshold heat generation amount (Hth1), it may be determined as normality in which no abnormality occurs, and the heat loss amount (Hloss) will be described with reference to FIG. 7.

Figure 5:
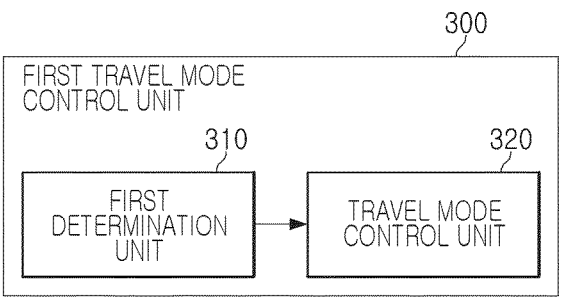
FIG. 5 is an exemplary diagram illustrating a first travel mode control unit.

FIG. 5 is an exemplary diagram illustrating a first travel mode control unit.

Referring to FIG. 5, the first travel mode control unit 300 may include a first determination unit 310 and a travel mode control unit 320.

When it is determined that travel on a road having rough terrain conditions is started, the first determination unit 310 may be configured to determine whether a current travel mode is an on-road travel mode (for example, a 4H travel mode).

When the current travel mode is the on-road travel mode (for example, a 4H travel mode), the travel mode control unit 320 may change the current travel mode to a semi-off-road travel mode (for example, a 4A travel mode). For example, when the current travel mode is not the on-road travel mode (for example, a 4H travel mode), that is, when the current travel mode is a semi-off-road travel mode or a dedicated off-road travel mode, the current travel mode may be maintained without change.

Figure 6:
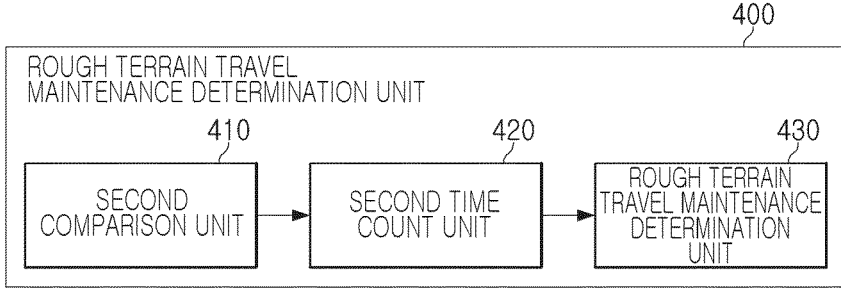
FIG. 6 is an exemplary diagram illustrating a rough terrain travel maintenance determination unit.

FIG. 6 is an exemplary diagram illustrating a rough terrain travel maintenance determination unit.

Referring to FIG. 6, the rough terrain travel maintenance determination unit 400 may include a second comparison unit 410, a second time count unit 420, and a rough terrain travel maintenance determination unit 430.

The second comparison unit 410 may be configured to determine whether the heat loss amount (Hloss) is greater than a second threshold heat generation amount (Hth2) during the semi-off-road travel mode (for example, a 4A travel mode). For example, when the heat loss amount (Hloss) is greater than the second threshold heat generation amount (Hth2), the second comparison unit 410 may output a second comparison signal including logic "1" (a high level) to the second time count unit 420. When the heat loss amount (Hloss) is less than or equal to the second threshold heat generation amount (Hth2), the second comparison unit 410 may output a second comparison signal including logic "0" (a low level) to the second time count unit 420.

The second time count unit 420 may count a second elapsed time (TC2) from a point in time at which the heat loss amount (Hloss) is greater than the second threshold heat generation amount (Hth2). For example, when a level of the second comparison signal input from the second comparison unit 410 is logic "1," the second time count unit 420 may start to count elapsed time and output the second elapsed time (TC2), which is a time count value, to the rough terrain travel determination unit 230.

The rough terrain travel maintenance determination unit 430 may be configured to determine whether the second elapsed time (TC2) is greater than or equal to a second reference time (Tref2), and may be configured to determine whether to maintain travel on a road having rough terrain conditions according to a determination result.

For example, when the second elapsed time (TC2) is greater than or equal to the second reference time (Tref2), the rough terrain travel maintenance determination unit 430 may be configured to conclude that the road having the rough terrain conditions is maintained. For example, for accuracy of an operation, the rough terrain travel maintenance determination unit 430 may be configured to conclude that a state in which the second elapsed time (TC2) is greater than or equal to the second reference time (Tref2) is maintained for a preset time (for example, tens of seconds), but such a configuration is only an example for description and understanding, and the present disclosure is not limited thereto.

For example, the second reference time (Tref2) may be equal to the first reference time (Tref1), but may be set differently according to a vehicle environment.

In an exemplary embodiment of the present disclosure, logic "1" and logic "0" may be a high level and an off level, and the high level and a low level may be voltage levels, and the present disclosure is not limited thereto. In the above example, a case in which the four-wheel drive vehicle travel mode control apparatus 10 is "active high" system is described, but the case is only one example for ease of description and understanding, and the present disclosure is not limited thereto. Accordingly, the present disclosure may be applied to a case in which the four-wheel drive vehicle travel mode control apparatus 10 is "active low" system.

Figure 7:
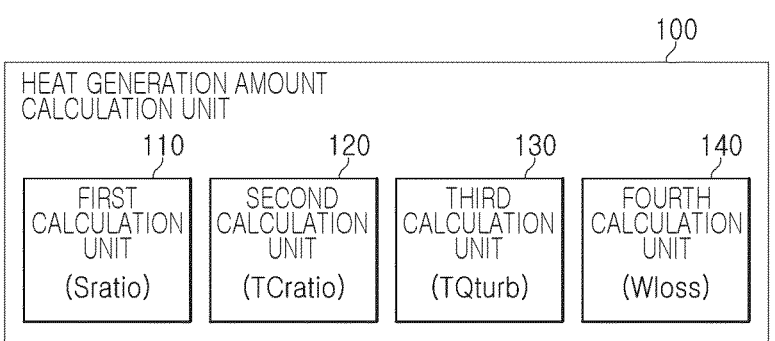
FIG. 7 is an exemplary diagram illustrating a heat generation amount calculation unit.

FIG. 7 is an exemplary diagram illustrating a heat generation amount calculation unit.

Referring to FIG. 7, the heat generation amount calculation unit 100 may include a first calculation unit 110, a second calculation unit 120, a third calculation unit 130, and a fourth calculation unit 140.

The first calculation unit 110 may be configured to determine a speed ratio, using a ratio of the engine RPM (RPMeng) to the turbine RPM (RPMturb). For example, referring to Equation 2 below, the speed ratio may be obtained by dividing the engine RPM (RPMeng) by the turbine RPM (RPMturb).

The second calculation unit 120 may determine a torque converter ratio (TCratio) (=torque converter ratio) based on the speed ratio, as indicated in Equation 3 below. For example, with reference to Equation 3 below, the torque converter ratio (TCratio) may be obtained as a function of the speed ratio. For example, the torque converter ratio (TCratio) may be obtained by determining a constant preset with respect to the speed ratio, but the present disclosure is not limited thereto.

The third calculation unit 130 may determine the turbine torque (TQTurb), based on the torque converter ratio (TCratio) and the engine torque (TQeng). For example, referring to Equation 4 below, the turbine torque (TQTurb) may be obtained by multiplying the engine torque (TQeng) by the torque converter ratio (TCratio).

The fourth calculation unit 140 may be configured to determine the heat loss amount (Hloss), based on an engine output value (OUTPUTeng) using the engine RPM (RPMeng) and the engine torque (TQeng), and a turbine output value (OUTPUTturb) using the turbine RPM (RPMturb) and the turbine torque (TQturb). For example, referring to Equation 5 below, the heat loss amount (Hloss) may be obtained by subtracting the engine output value (OUTPUTeng) and the turbine output value (OUTPUTturb).

$$Sratio = RPMturb/RPMeng \qquad \text{[Equation 2]}$$

$$TCratio = f(Sratio) \qquad \text{[Equation 3]}$$

$$TQturb[Nm] = TQeng[Nm]*TCratio \qquad \text{[Equation 4]}$$

$$Hloss[W] = f(OUTPUTeng - OUTPUTturb) = (RPMeng*Qeng) - (PMturb*turb) \qquad \text{[Equation 5]}$$

As described above, when travelling off-road in a 4H travel mode, slip may occur at a constant high rotation speed in a torque converter in a transmission due to low vehicle speed and high required torque. Here, slip may refer to a difference between an engine output shaft RPM and a transmission input shaft RPM. Accordingly, a high amount of heat may be generated due to loss in the torque converter, and an oil temperature may increase rapidly.

Conversely, when travelling in a 4A travel mode, heat generation of transmission oil may be suppressed by reducing the number of slip rotations, as compared to the 4H travel mode.

Furthermore, the 4L travel mode may include a high gear ratio, as compared to the 4H travel mode or the 4A travel mode, and thus a significantly small amount of slip may occur in the torque converter in the transmission so that heat generation due to loss may be suppressed.

Hereinafter, a method for controlling a travel mode of a four-wheel drive vehicle will be described with reference to FIGS. 8 to 13. In the present application, a description of a method for controlling a travel mode of a four-wheel drive vehicle and a description of an apparatus for controlling a travel mode of a four-wheel drive vehicle may complement each other or may be applied in common, unless the descriptions are mutually exclusive. Accordingly, a repeated description may be omitted. Hereinafter, main processes of the method for controlling a travel mode of a four-wheel drive vehicle will be described.

Figure 8:
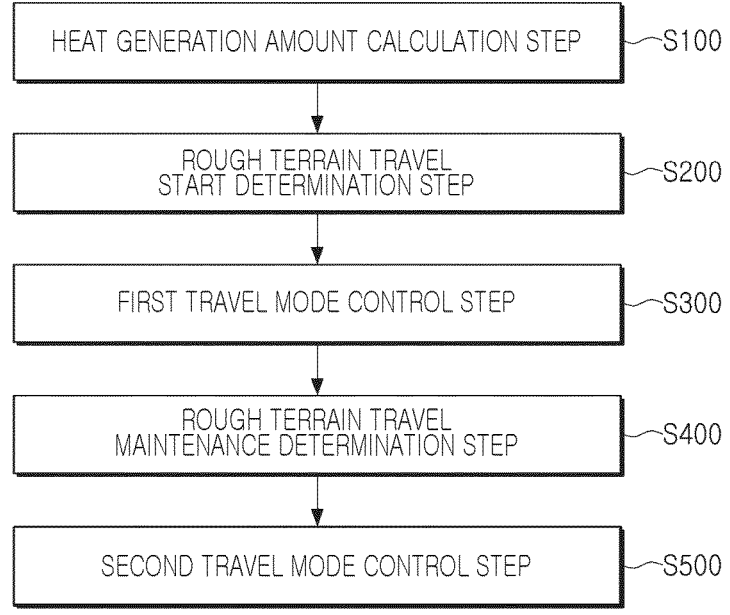
FIG. 8 is a flowchart illustrating a method for controlling a travel mode of a four-wheel drive vehicle according to an exemplary embodiment of the present disclosure.

FIG. 8 is a flowchart illustrating a method for controlling a travel mode of a four-wheel drive vehicle according to an exemplary embodiment of the present disclosure.

Referring to FIGS. 1 and 8, a four-wheel drive vehicle travel mode control method according to an exemplary embodiment of the present disclosure may be performed, for example, by the four-wheel drive vehicle travel mode control apparatus 10.

The wheel drive vehicle travel mode control method may include a heat generation calculation step (S100), a rough terrain travel start determination step (S200), a first travel mode control step (S300), a rough terrain travel maintenance determination step (S400), and a second travel mode control step (S500).

In the heat generation calculation step (S100), the four-wheel drive vehicle travel mode control apparatus 10 may determine a heat loss amount (Hloss) of a torque converter, based on input information of a four-wheel drive vehicle. For example, the input information may be, as described above, an engine RPM (RPMeng), a turbine RPM (RPMturb), and engine torque (TQeng).

In the rough terrain travel start determination step (S200), the four-wheel drive vehicle travel mode control apparatus 10 may determine whether to start travel on a road having rough terrain conditions, based on the heat loss amount (Hloss).

In the first travel mode control step (S300), when it is determined to start the travel on the road having the rough terrain conditions, the four-wheel drive vehicle travel mode control apparatus 10 may be configured for controlling entry into a semi-off-road travel mode (for example, a 4A travel mode) when a current travel mode is an on-road travel mode (for example, a 4H travel mode).

In the rough terrain travel maintenance determination step (S400), the four-wheel drive vehicle travel mode control apparatus 10 may determine whether to maintain the travel on the road having the rough terrain conditions during the semi-off-road travel mode (for example, a 4A travel mode), based on the heat loss amount (Hloss).

In the second travel mode control step (S500), when it is determined to maintain the travel on the road having the rough terrain conditions, the four-wheel drive vehicle travel mode control apparatus 10 may be configured for controlling entry into a dedicated off-road travel mode (for example, a 4L travel mode) from the current travel mode.

Figure 9:
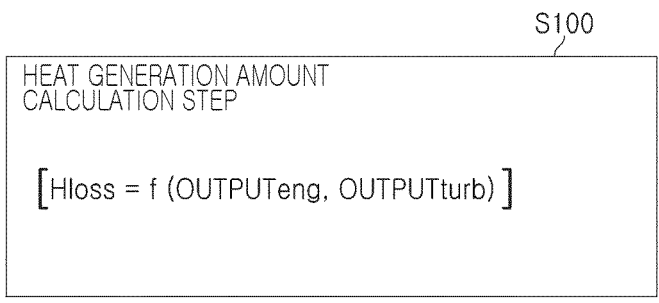
FIG. 9 is an exemplary diagram illustrating a heat generation amount calculation step.

FIG. 9 is an exemplary diagram illustrating a heat generation amount calculation step.

Referring to FIG. 9, in the heat generation calculation step (S100), the four-wheel drive vehicle travel mode control apparatus 10 may be configured to determine the heat loss amount (Hloss), using an engine output value based on the engine RPM (RPMeng) and the engine torque (TQeng), and a turbine output value based on the turbine RPM (RPMturb) and turbine torque (TQturb), as indicated in Equation 1 above.

Figure 10:
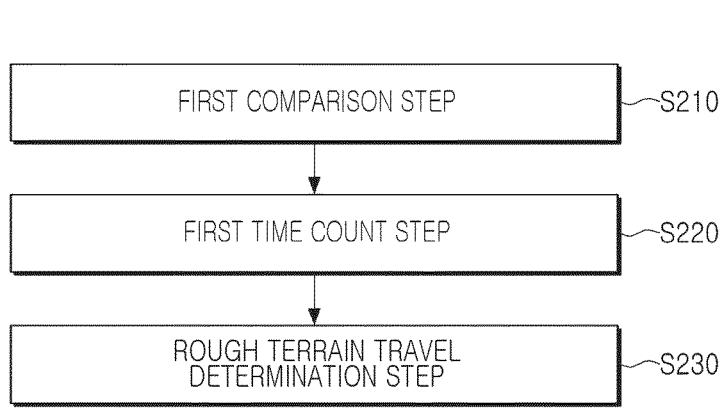
FIG. 10 is an exemplary diagram illustrating a rough terrain travel start determination step.

FIG. 10 is an exemplary diagram illustrating a rough terrain travel start determination step.

Referring to FIG. 10, the rough terrain travel start determination step S200 may include a first comparison step S210, a first time count step S220, and a rough terrain travel determination step S230.

In the first comparison step S210, the four-wheel drive vehicle travel mode control apparatus 10 may be configured to determine whether the heat loss amount (Hloss) is greater than a first threshold heat generation amount (Hth1)

In the first time count step S220, the four-wheel drive vehicle travel mode control apparatus 10 may count a first elapsed time (TC1) from a point in time at which the heat loss amount (Hloss) is greater than the first threshold heat generation amount (Hth1).

In the rough terrain travel determination step S230, the four-wheel drive vehicle travel mode control apparatus 10 may be configured to determine whether the first elapsed time (TC1) is greater than or equal to a reference time (Tref), and may be configured to determine whether to start travel on a road having a rough travel condition according to a determination result.

Figure 11:
FIG. 11 is an exemplary diagram illustrating a first travel mode control step.
Figure 11:
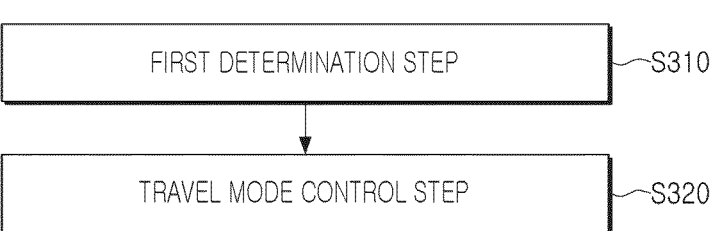

FIG. 11 is an exemplary diagram illustrating a first travel mode control step.

Referring to FIG. 11, the first travel mode control step S300 may include a first determination step S310 and a travel mode control step S320.

In the first determination step S310, the four-wheel drive vehicle travel mode control apparatus 10 may be configured to determine whether a current travel mode is an on-road travel mode (for example, a 4H travel mode) when it is determined to start the travel on the road having the rough terrain conditions.

In the travel mode control step (S320), the four-wheel drive vehicle travel mode control apparatus 10 may change the current travel mode to a semi-off-road travel mode (for example, a 4A travel mode) when the current travel mode is the on-road travel mode (for example, a 4H travel mode).

Figure 12:
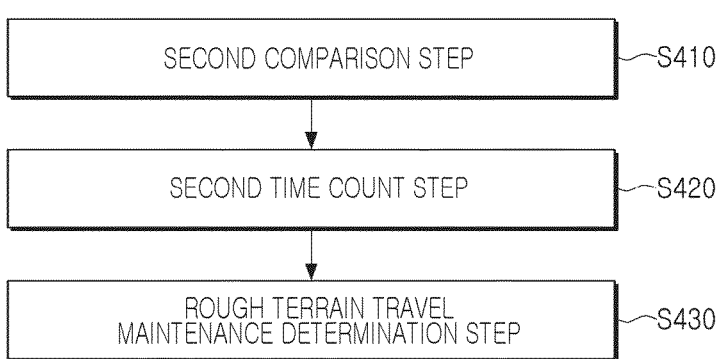
FIG. 12 is an exemplary diagram illustrating a rough terrain travel maintenance determination step.

FIG. 12 is an exemplary diagram illustrating a rough terrain travel maintenance determination step.

Referring to FIG. 12, the rough terrain travel maintenance determination step S400 may include a second comparison step S410, a second time count step S420, and a rough terrain travel maintenance determination step S430.

In the second comparison step S410, the four-wheel drive vehicle travel mode control apparatus 10 may be configured to determine whether the heat loss amount (Hloss) is greater than a second threshold heat generation amount (Hth2) during the semi-off-road travel mode (for example, a 4A travel mode).

In the second time count step S420, the four-wheel drive vehicle travel mode control apparatus 10 may count a second elapsed time (TC2) from a point in time at which the heat loss amount (Hloss) is greater than the second threshold heat generation amount (Hth2).

In the rough terrain travel maintenance determination step (S430), the four-wheel drive vehicle travel mode control apparatus 10 may be configured to determine whether the second elapsed time (TC2) is greater than or equal to a second reference time (Tref2), and may be configured to determine whether to maintain travel on a road having rough terrain conditions according to a determination result.

Figure 13:
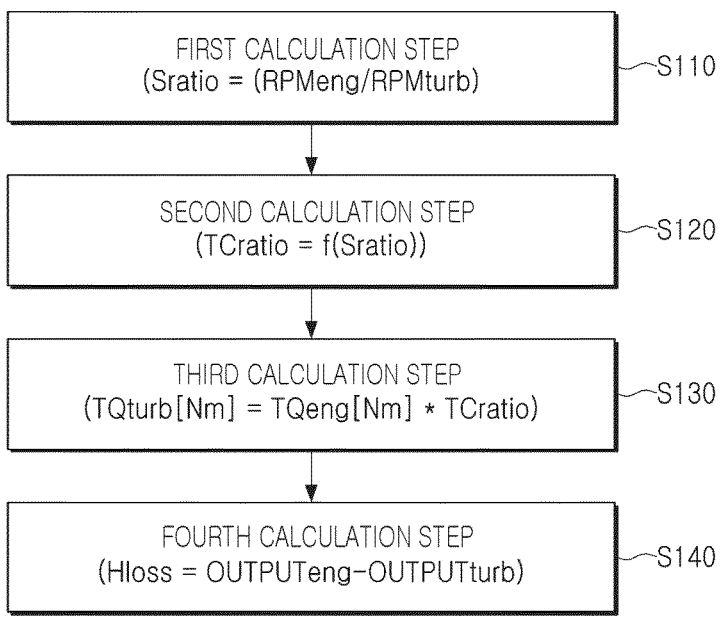
FIG. 13 is an exemplary diagram illustrating a heat generation amount calculation step.

FIG. 13 is an exemplary diagram illustrating a heat generation amount calculation step.

Referring to FIG. 13, the heat generation amount calculation step S100 may include a first calculation step S110, a second calculation step S120, a third calculation step S130, and a fourth calculation step S140.

In the first calculation step S110, the four-wheel drive vehicle travel mode control apparatus 10 may be configured to determine a speed ratio, using a ratio of the engine RPM (RPMeng) to the turbine RPM (RPMturb).

In the second calculation step S120, the four-wheel drive vehicle travel mode control apparatus 10 may determine a torque converter ratio (TCratio) (=torque converter ratio), based on the speed ratio.

In the third calculation step (S130), the four-wheel drive vehicle travel mode control apparatus 10 may be configured to determine the turbine torque (TQturb), based on the torque converter ratio (TCratio) and the engine torque (TQeng).

In the fourth calculation step S140, the four-wheel drive vehicle travel mode control apparatus 10 may be configured to determine the heat loss amount (Hloss), based on an engine output value (OUTPUTeng) using the engine RPM (RPMeng) and the engine torque (TQeng), and a turbine output value (OUTPUTturb) using the turbine RPM (RPMturb) and the turbine torque (TQturb).

Figure 14:
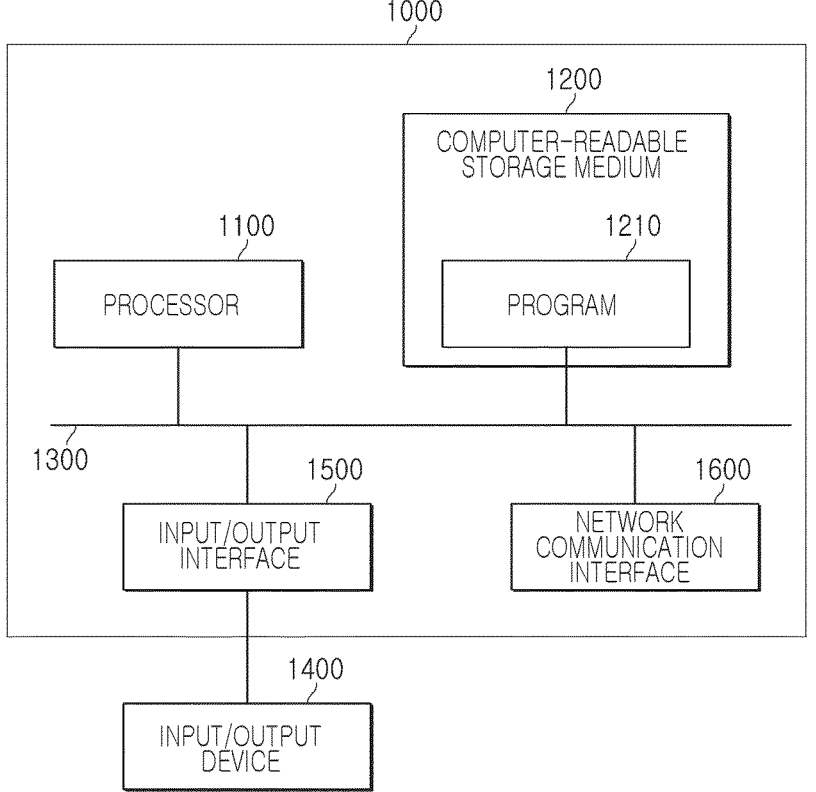
FIG. 14 is a block diagram of a computing device configured for fully or partially implementing an apparatus and a method for controlling a four-wheel drive vehicle according to an exemplary embodiment of the present disclosure.

FIG. 14 is a block diagram of a computing device configured for fully or partially implementing an apparatus and a method for controlling a four-wheel drive vehicle according to an exemplary embodiment of the present disclosure.

As illustrated in FIG. 14, a computing device 1000 may include at least one processor 1100, a computer-readable storage medium 1200, and a communication bus 1300.

The processor 1100 may cause the computing device 1000 to operate according to the example embodiments described above. For example, the processor 1100 may execute one or more programs stored in the computer-readable storage medium 1200. The one or more programs may include one or more computer-executable instructions. When executed by the processor 1100, the one or more computer-executable instructions may be configured to cause the computing device 1000 to perform operations according to example embodiments.

The computer-readable storage medium 1200 may be configured to store the computer-executable instruction or program code, program data, and/or other suitable forms of information. A program 1210, stored in the computer-readable storage medium 1200, may include a set of instructions executable by the processor 1100. In an example embodiment, the computer-readable storage medium 1200 may be a memory (volatile memory such as a random access memory, non-volatile memory, or any suitable combination thereof), one or more magnetic disk storage devices, optical disk storage devices, flash memory devices, other types of storage media that are accessible by the computing device 1000 and are configured for storing target information, or any suitable combination thereof.

The communication bus 1300 may interconnect various other components of the computing device 1000, including the processor 1100 and the computer-readable storage medium 1200.

The computing device 1000 may also include one or more input/output interfaces 1500 providing an interface for one or more input/output devices 1400, and one or more network communication interfaces 1600. The input/output interface 1500 and the network communication interface 1600 may be connected to the communication bus 1300. The network may be one of a cellular network, such as global system for mobile communications (GSM), enhanced data rates for GSM evolution (EDGE), general packet radio service (GPRS), Code Division Multiple Access (CDMA), time division-CDMA (TD-CDMA), Universal Mobile Telecommunications System (UMTS), or long-term evolution (LTE), or another cellular network.

The input/output device 1400 may be connected to other components of the computing device 1000 through the input/output interface 1500. The exemplary input/output device 1400 may include a pointing device (such as a mouse or trackpad), a keyboard, a touch input device (such as a touchpad or touchscreen), a voice or sound input device, input devices such as various types of sensor devices and/or photographing devices, and/or output devices such as a display device, a printer, a speaker, and/or a network card. The exemplary input/output device 1400 may be included in the computing device 1000 as a component included in the computing device 1000, or may be connected to the computing device 1000 as a device distinct from the computing device 1000.

Example embodiments of the present disclosure may include a program for performing the methods described herein on a computer, and a computer-readable recording medium including the program. The computer-readable recording medium may include, alone or in combination with program instructions, local data files, local data structures, and the like. The medium may be those specially designed and constructed for the purposes of the exemplary embodiments of the present disclosure, or may be of the well-known kind and available to those including skill in the computer software arts. Examples of the computer-readable medium include magnetic media such as hard disks, floppy disks, and magnetic tape, optical media such as CD ROM discs and DVDs, magneto-optical media such as optical discs, and hardware devices that are specially configured to store and perform program instructions, such as read-only memory (ROM), random access memory (RAM), flash memory, and the like. Examples of the program may include both a machine code, such as a code produced by a compiler, and a higher-level code which may be executed by the computer using an interpreter.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method disclosed in the aforementioned various exemplary embodiments of the present disclosure.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Software implementations may include software components (or elements), object-oriented software components, class components, task components, processes, functions, attributes, procedures, subroutines, program code segments, drivers, firmware, microcode, data, database, data structures, tables, arrays, and variables. The software, data, and the like may be stored in memory and executed by a processor. The memory or processor may employ a variety of means well known to a person having ordinary knowledge in the art.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, multiple operations may be merged, or any operation may be divided, and a specific operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "or" used in an exemplary embodiment of the present disclosure should be interpreted as indicating "additionally or alternatively."

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

The terms used to describe the exemplary embodiments are used for describing specific embodiments, and are not intended to limit the embodiments. As used in the description of the exemplary embodiments and in the claims, the singular forms "a", "an", and "the" include plural referents unless the context clearly dictates otherwise. The expression "and/or" is used to include all possible combinations of terms.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

As used herein, conditional expressions such as "if" and "when" are not limited to an optional case and are intended to be interpreted, when a specific condition is satisfied, to perform the related operation or interpret the related definition according to the specific condition.

Terms such as first and second may be used to describe various elements of the embodiments. However, various components according to the exemplary embodiments should not be limited by the above terms. These terms are only used to distinguish one element from another.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for controlling a travel mode of a four-wheel drive vehicle, the apparatus comprising:

a heat generation amount calculation unit configured to determine a heat loss amount of a torque converter, based on input information of the four-wheel drive vehicle;

a rough terrain travel start determination unit configured to determine whether to start travel of the vehicle on a road having rough terrain conditions, based on the heat loss amount;

a first travel mode control unit configured to control entry into a semi-off-road travel mode when a current travel mode is an on-road travel mode, in response that the rough terrain travel start determination unit concludes to start the travel on the road having the rough terrain conditions;

a rough terrain travel maintenance determination unit configured to determine whether to maintain the travel on the road having the rough terrain conditions during the semi-off-road travel mode, based on the heat loss amount; and a second travel mode control unit configured to control entry into a dedicated off-road travel mode from the current travel mode in response that the rough terrain travel maintenance determination unit concludes to maintain the travel on the road having the rough terrain conditions.

2. The apparatus of claim 1, wherein the input information of the four-wheel drive vehicle includes an engine Revolution Per Minutes (RPM), a turbine RPM, and an engine torque, and wherein the heat loss amount calculation unit is further configured to determine the heat loss amount, using an engine output value determined based on the engine RPM and the engine torque, and a turbine output value determined based on the turbine RPM and a turbine torque.

3. The apparatus of claim 1, wherein the rough terrain travel start determination unit includes:
   a first comparison unit configured to determine whether the heat loss amount is greater than a first threshold heat generation amount;
   a first time count unit configured to count a first elapsed time from a point in time at which the heat loss amount is greater than the first threshold heat generation amount; and
   a rough terrain travel determination unit configured to determine whether the first elapsed time is greater than or equal to a first reference time, and to determine whether to start the travel on the road having the rough terrain conditions based on a result of determining whether the first elapsed time is greater than or equal to the first reference time.

4. The apparatus of claim 1, wherein the first travel mode control unit includes:
   a first determination unit configured to determine whether the current travel mode is the on-road travel mode in response that the rough terrain travel start determination unit concludes to start the travel on the road having the rough terrain conditions; and
   a travel mode control unit configured to change the current travel mode to the semi-off-road travel mode in response that the current travel mode is the on-road travel mode.

5. The apparatus of claim 1, wherein the rough terrain travel maintenance determination unit includes:
   a second comparison unit configured to determine whether the heat loss amount is greater than a second threshold heat generation amount during the semi-off-road travel mode;
   a second time count unit configured to count a second elapsed time from a point in time at which the heat loss amount is greater than the second threshold heat generation amount; and
   a rough terrain travel maintenance determination unit configured to determine whether the second elapsed time is greater than a second reference time, and to determine whether to maintain the travel on the road having the rough terrain conditions, based on a result of determining whether the second elapsed time is greater than the second reference time.

6. The apparatus of claim 2, wherein the heat generation amount calculation unit includes:
   a first calculation unit configured to determine a speed ratio, using a ratio of the engine RPM to the turbine RPM;
   a second calculation unit configured to determine a torque converter ratio, based on the speed ratio;
   a third calculation unit configured to determine the turbine torque, based on the torque converter ratio and the engine torque; and
   a fourth calculation unit configured to determine the heat loss amount, based on the engine output value using the engine RPM and the engine torque, and the turbine output value using the turbine RPM and the turbine torque.

7. A method for controlling a travel mode of a four-wheel drive vehicle, the method comprising:

a heat generation amount calculation step of determining a heat loss amount of a torque converter, based on input information of the four-wheel drive vehicle;
   a rough terrain travel start determination step of determining whether to start travel on a road having rough terrain conditions, based on the heat loss amount;
   a first travel mode control step of controlling entry into a semi-off-road travel mode in response that a current travel mode is an on-road travel mode, in response that it is determined to start the travel on the road having the rough terrain conditions;
   a rough terrain travel maintenance determination step of determining whether to maintain the travel on the road having the rough terrain conditions during the semi-off-road travel mode, based on the heat loss amount; and
   a second travel mode control step of controlling entry into a dedicated off-road travel mode from the current travel mode in response that it is determined to maintain the travel on the road having the rough terrain conditions.

8. The method of claim 7,
   wherein the input information of the four-wheel drive vehicle includes an engine Revolution Per Minutes (RPM), a turbine RPM, and an engine torque, and
   wherein the heat loss amount calculation step includes determining the heat loss amount, using an engine output value determined based on the engine RPM and the engine torque, and a turbine output value determined based on the turbine RPM and a turbine torque.

9. The method of claim 7, wherein the rough terrain travel start determination step includes:
   a first comparison step of determining whether the heat loss amount is greater than a first threshold heat generation amount;
   a first time count step of counting a first elapsed time from a point in time at which the heat loss amount is greater than the first threshold heat generation amount; and
   a rough terrain travel determination step of determining whether the first elapsed time is greater than or equal to a first reference time, and determining whether to start travel on the road having the rough terrain conditions, based on a result of determining whether the first elapsed time is greater than or equal to the first reference time.

10. The method of claim 7, wherein the first travel mode control step includes:
   a first determination step of determining whether the current travel mode is the on-road travel mode in response that it is determined to start the travel on the road having the rough terrain conditions; and
   a travel mode control step of changing the current travel mode to the semi-off-road travel mode in response that the current travel mode is the on-road travel mode.

11. The method of claim 7, wherein the rough terrain travel maintenance determination step includes:
   a second comparison step of determining whether the heat loss amount is greater than a second threshold heat generation amount during the semi-off-road travel mode;
   a second time count step of counting a second elapsed time from a point in time at which the heat loss amount is greater than the second threshold heat generation amount; and
   a rough terrain travel maintenance determination step of determining whether the second elapsed time is greater than a second reference time, and to determine whether to maintain the travel on the road having the rough terrain conditions, based on a result of determining whether the second elapsed time is greater than the second reference time.

12. The method of claim 8, wherein the heat generation amount calculation step includes:

a first calculation step of determining a speed ratio, using a ratio of the engine RPM to the turbine RPM;

a second calculation step of determining a torque converter ratio based on the speed ratio;

a third calculation step of determining the turbine torque, based on the torque converter ratio and the engine torque; and a fourth calculation step of determining the heat loss amount, based on the engine output value using the engine RPM and the engine torque, and the turbine output value using the turbine RPM and the turbine torque.

13. An apparatus for controlling a travel mode of a four-wheel drive vehicle, the apparatus comprising:

a processor; and a non-transitory storage medium containing program instructions for an operation of the processor, wherein the processor is configured to, by executing the program instructions, determine a heat loss amount of a torque converter, based on input information of the four-wheel drive vehicle;

determine whether to start travel of the vehicle on a road having rough terrain conditions, based on the heat loss amount;

control entry into a semi-off-road travel mode when a current travel mode is an on-road travel mode, upon concluding to start the travel on the road having the rough terrain conditions;

determine whether to maintain the travel on the road having the rough terrain conditions during the semi-off-road travel mode, based on the heat loss amount; and to control entry into a dedicated off-road travel mode from the current travel mode upon concluding to maintain the travel on the road having the rough terrain conditions.

14. The apparatus of claim 13, wherein the input information of the four-wheel drive vehicle includes an engine Revolution Per Minutes (RPM), a turbine RPM, and an engine torque, and wherein the processor is further configured to determine the heat loss amount, using an engine output value determined based on the engine RPM and the engine torque, and a turbine output value determined based on the turbine RPM and a turbine torque.

15. The apparatus of claim 13, wherein the processor is further configured to:

determine whether the heat loss amount is greater than a first threshold heat generation amount;

count a first elapsed time from a point in time at which the heat loss amount is greater than the first threshold heat generation amount; and determine whether the first elapsed time is greater than or equal to a first reference time, and to determine whether to start travel on the road having the rough terrain conditions based on a result of determining whether the first elapsed time is greater than or equal to the first reference time.

16. The apparatus of claim 13, wherein the processor is further configured to:

determine whether the current travel mode is the on-road travel mode upon concluding to start the travel on the road having the rough terrain conditions; and change the current travel mode to the semi-off-road travel mode in response that the current travel mode is the on-road travel mode.

17. The apparatus of claim 13, wherein the processor is further configured to:

determine whether the heat loss amount is greater than a second threshold heat generation amount during the semi-off-road travel mode;

count a second elapsed time from a point in time at which the heat loss amount is greater than the second threshold heat generation amount; and determine whether the second elapsed time is greater than a second reference time, and determine whether to maintain the travel on the road having the rough terrain conditions, based on a result of determining whether the second elapsed time is greater than the second reference time.

18. The apparatus of claim 14, wherein the processor is further configured to:

determine a speed ratio, using a ratio of the engine RPM to the turbine RPM;

determine a torque converter ratio based on the speed ratio;

determine the turbine torque based on the torque converter ratio and the engine torque; and determine the heat loss amount, based on the engine output value using the engine RPM and the engine torque, and the turbine output value using the turbine RPM and the turbine torque.

* * * * *